2,797,176
Patented June 25, 1957

2,797,176

PROCESS FOR INTERRUPTED HYDROLYZING OF STARCH

Jacob B. Gottfried, Chicago, and William K. Luby, La Grange, Ill., and William B. Newkirk, San Diego, Calif., assignors to Corn Products Refining Company, New York, N. Y., a corporation of New Jersey No Drawing. Application November 6, 1953, Serial No. 390,748

14 Claims. (Cl. 127—40)

This invention relates to an improved method of hydrolyzing starch with acid to produce dextrose containing liquors and, particularly, such liquors as are used in the production of pure crystalline dextrose.

Pure crystalline dextrose is currently manufactured by hydrolyzing starch with acid in accordance with the general principles described in Newkirk Patents Nos. 1,471,347, October 23, 1923, and 1,521,830, January 6, 1925. Ion exchange resins may be used to demineralize and refine the dextrose containing liquors at various stages of the process in accordance with the principles of U. S. Patents Nos. 2,323,191, August 31, 1943; 2,389,119, November 20, 1945; and 2,606,847, August 12, 1952.

The starch which gives satisfactory results in the production of crystalline dextrose has been, and still is to some extent, obtained in the wet milling of corn by the so-called tabling method and contains a very small amount of insoluble protein, i. e. corn gluten, generally 0.4 percent or below. The quality of the starch undergoing hydrolysis determines to a large extent the quality of the dextrose containing hydrolyzate and to some extent the yield of crystalline dextrose obtained therefrom. The presence of much more than about 0.4 percent of insoluble protein in the starch used for producing dextrose, by present methods, cannot be tolerated if maximum yield and quality of dextrose are to be obtained without excessive use of costly refining agents. The insoluble protein becomes solubilized during acid hydrolysis and forms melanoidin color bodies with dextrose or dextrose destruction products. These color bodies although not always as dark in color as the caramel type of color developed during acid hydrolysis of pure starch are removed with much greater difficulty than the caramel type. If the aforementioned color bodies and other accompanying organic impurities are not removed, in addition to the undesirable color they impart to the dextrose liquors, they also interfere with the crystallization of dextrose to the extent that their presence decreases the actual concentration of dextrose in the liquor to be crystallized. In such case, not only is crystallization greatly inhibited but the cost of refining is greatly increased. The cost of refining dextrose liquors produced by current methods is increased about two-fold for each two-fold increase of insoluble protein present in the starch undergoing hydrolysis and heretofore it has not been considered commercially feasible to hydrolyze starch containing more than about 0.4 percent of insoluble protein for the production of dextrose liquors.

Although the tabling method for primary separation of mill starch into starch and gluten fractions produces starch which is satisfactory for use in making crystalline dextrose, starch tables are now being replaced, in whole or in part, by centrifuges, in view of the many advantages of the latter over tables in milling operations, e. g., faster separation, increased capacity of equipment, decrease in housing space and maintenance thereof, etc. And, although it is possible to obtain starch with an insoluble protein content as low as 0.4 percent by using centrifuges in primary separation, this is not practical unless a multiple pass system of centrifuges is employed. The use of a multiple pass system obviously increases the cost of separating mill starch into its fractions. Regardless of whether tables or centrifuges are employed for separation of mill starch into its components, there are obtained, in addition to prime starch, fractions referred to as squeegee, "middling" or "stripper" starch, which fractions contain a relatively high proportion of insoluble protein. Further treatment or recycling of these fractions is required to obtain from them starch having a sufficiently low insoluble protein content to permit production therefrom of high quality dextrose liquors by conventional methods of hydrolysis and refining.

It will be apparent that milling costs might be reduced considerably if it were possible, for example, to avoid recycling middlings or stripper starch, thereby increasing the capacity of the mill house and at the same time obtaining better quality prime starch. It will also be apparent that the economy of wet milling of grains would be benefited considerably if starch containing a relatively high amount of insoluble protein might be removed from the mill house stream and used for some purposes, such as in the production of crystalline dextrose or dextrose containing sirups, as is the more highly refined starch currently used, without loss in yield and quality of the end product. Accordingly, it is the main object of this invention to provide a process whereby starch containing higher percentages of insoluble proten than can be tolerated in conventional process, i. e., more than about 1 percent, may be used in the production of crystalline dextrose or dextrose containing sirups without decreasing the quality or yield obtained. Other objects will appear hereinafter.

The present invention consists essentially of hydrolyzing starch containing a relatively large amount of protein, i. e., about 1 percent or more, with acid in two stages, the hydrolyzate in at least one stage being treated with a clarifying clay, and thereafter concentrating and refining, and where crystalline dextrose is desired, subjecting the final liquor to crystallization in the customary manner. It has been discovered quite unexpectedly that bentonite or equivalent clay removes melanoidin type color bodies from starch hydrolyzates so efficiently that the cost of subsequently refining the hydrolyzates with carbon is greatly reduced because the carbon requirement is reduced.

In carrying out the present invention, a slurry of starch is first hydrolyzed with acid under conditions conventionally employed in the production of glucose sirup from corn starch, for example, until the D. E. value (dextrose equivalent, i. e. percent of reducing sugars, on dry basis, calculated as dextrose) of the partial hydrolyzate or converter liquor is between about 18 and about 55 percent. Optionally, the hydrolyzate at this stage may be treated with bentonite or equivalent clarifying clay either in the converter as rapidly as formed or at the end of the conversion. The insoluble impurities in the hydrolyzate are separated therefrom as by filtration with filter aid, if desired. If the equipment employed for the separation stage will not withstand the acidic hydrolyzate, the pH of the hydrolyzate may be adjusted to 4.5 to 5.5 with sodium carbonate or sodium hydroxide, for example, and then the insoluble impurities separated therefrom. The clarified liquor is further hydrolyzed under conditions conventionally employed in the production of crystalline dextrose until the D. E. value is about 60 percent, if a sirup having a high D. E. value is desired, or about 88 to about 92 percent, in the event it is desired to make crystalline dextrose. The final hydrolyzate is optionally treated with bentonite or equivalent clarifying clay during conversion or at the end of the conversion. The treatment with bentonite or other clay may take place during either or both stages of the conversion, or may follow either or both stages of the conversion, but there should be at least one such treatment. After clarification, the final hydrolyzate may be treated in accordance with one of several methods prior to final decolorization, concentration, and crystallization, if desired. For example, the pH of the final hydrolyzate is adjusted to 4.5 to 5.5 with sodium carbonate or sodium hydroxide, and the insoluble impurities, and bentonite, if present, are separated, as by filtration, from the hydrolyzate. Or the aforementioned hydrolyzate after the adjustment of pH may be freed of insoluble impurities and demineralized and refined with ion exchange resins. Or the final hydrolyzate without adjustment of pH may be freed of insoluble impurities and demineralized and refined by treatment with ion exchange resins. The system may be closed or "bottled up" in accordance with the principles of U. S. Patent No. 2,606,847 referred to hereinabove.

The principles of the present invention are particularly applicable to all cereal starches, i. e., waxy maize, milo, corn (maize), rice, etc., which contain insoluble protein. These starches may be obtained from cereal grains by wet or dry milling operations. Starch fractions obtained at various stages in the wet milling of corn or milo grain, for example, may be treated in accordance with the principles of the present invention. For example, mill starch itself may be so treated or the fractions referred to as squeegee starch, middlings or stripper starch may also be used. Tuber and root starches containing high amounts of protein may also be treated in accordance with principles of our invention. In fact any combination of starch and insoluble protein, such as gluten, for example, may be used, but obviously there is a practical limit of insoluble protein from the point of view of economics based on refining costs and recovery of insoluble protein. The upper limit of insoluble protein present in the starch is about 10 percent for all practical purposes. The insoluble protein may be recovered at the separation or filtration stages of the process of the present invention and may be used as animal feed. Although the principles of the present invention may be applied to starch containing less than about one percent of insoluble protein, it is of little advantage to do so.

The density of the slurry undergoing hydrolysis at the first stage, may be within the range of about 8 to about 23° Bé., but should preferably be at the higher end of the range because there is more efficient utilization of the hydrolyzing acid and greater steam economy. The density of the liquor undergoing hydrolysis at the second stage for practical operating purposes should be within the range of about 8 to about 12° Bé., although lower or higher densities may be used.

Typical values for the conditions under which hydrolysis is carried out at both stages will appear hereinafter in the examples. However, the conditions for hydrolysis of starch are known to those skilled in the art and need not be set forth in detail.

The starch to be used in carrying out the present invention preferably should be washed in conventional manner to recover from it soluble materials, and to reduce the content of soluble materials to about 0.3 percent, dry substance basis, or lower.

The hydrolysis of the starch during the first stage should preferably be carried out to a point where no unconverted starch remains in the liquor, i. e. to about 30 to about 40 D. E. Although D. E. values may be as low as about 18 percent and as high as about 55 percent, the higher the D. E. value obtained, the higher will be the amount of insoluble protein which becomes solubilized, and the lower the D. E. value, the slower will be the rate of filtration. The less drastic conditions of hydrolysis at the first stage as compared with those used in present methods for making dextrose reduce considerably the amount of insoluble protein which becomes solubilized. The insoluble protein which remains unchanged can readily be filtered off at this stage. The solubilized proteins and the color bodies they form may be removed to as great an extent as possible at this stage by treating the liquor with bentonite. Regardless of whether bentonite is used at this stage or not, the insoluble proteins and any other insoluble impurities should be separated from the liquor before the second stage of hydrolysis. If filter equipment is available which is not affected by the acidic liquor, it is preferable not to neutralize the liquor since this necessitates reacidification of the liquor for the second stage of the hydrolysis.

The second stage of the hydrolysis should be carried on until the D. E. value is about 88 to 92 percent, if crystalline dextrose is desired. It is also advantageous to make so-called high D. E. sirup, i. e., having D. E. values as high as 60 percent, by the method of the present invention in which case the first stage of the hydrolysis should be carried on to preferably not higher than about 30 D. E. Treatment of the hydrolyzate with bentonite during or after the second stage of hydrolysis also removes solubilized proteins and certain other impurities not removed previously or formed during the second stage of hydrolysis, particularly if only a small amount or no bentonite was used after the first stage of hydrolysis.

The bentonite may be added to the converter along with the material to be hydrolyzed before each stage of the conversion or it may be added to the liquor as soon as the liquor is withdrawn from the converter. The bentonite, in addition to its refining action, acts as a "scouring" or anti-deposition agent and prevents the converter from becoming clogged by the insoluble impurities. When the hydrolyzate is treated with bentonite after it leaves the converter, the time of treatment may vary from about 5 to 45 minutes or longer although this factor is not critical. About 10 to 30 minutes will ordinarily be required in the mechanical handling of the liquor during this treatment. The bentonite may be used before or after adjustment of the pH of the hydrolyzate prior to filtration although better results are obtained when bentonite is used on an acidic liquor than on one which has been neutralized. The bentonite may be added in a single dose or in increments, with or without intermediate filtration after each addition, at either or both stages of the conversion. In any event the insoluble impurities are separated from the partial hydrolyzate before the second stage of hydrolysis is commenced. Also the total amount of bentonite to be used may be divided and part used at the first stage and the rest at the second stage.

The amount of bentonite to be used at either stage depends upon the amount of refining desired at this point and the efficiency of the bentonite, the degree of refining by bentonite increasing with increased dosage. For practical purposes, 0.3 percent to 1.0 percent, dry substance basis, of Wyoming type bentonite will give satisfactory results when the insoluble protein content of corn starch, for example, is about 1 percent. When the starch contains 2 percent of insoluble protein, 2 percent of bentonite is satisfactory and when the starch contains 5 percent of insoluble protein, 3 percent of bentonite is satisfactory. More than 3 percent of bentonite is also beneficial in terms of refining, but for all practical purposes, the amount of bentonite used is limited because it may cause some difficulty in disposing of large amounts of spent bentonite. Some types of bentonite are more efficient than others, and some starches require more or less, and the amount to be used can be determined readily from preliminary efficiency tests. A comparison of the efficiency of some domestic and foreign types of bentonite is set forth in Table V (Example VI), which follows hereinafter.

It has been noted that when bentonite is used after the first stage of hydrolysis and then again after the second stage of hydrolysis that there may be some difficulty in filtering off the bentonite at the second stage if added as neutral hydrated slurry. It appears that the fat and proteins released from the starch during hydrolysis affect the bentonite in some way so as to make the bentonite more easily filterable than when such fat and proteins are not present. If it is desired to use bentonite at both stages, a small amount of the fat and protein may be left in the hydrolyzate after the first stage to assist in filtering off the bentonite at the second stage, for example, by using a smaller amount of bentonite at the first stage. Or the bentonite may be hydrated in acidic water or in the liquor during the second stage of hydrolysis in order to achieve easier filtration.

The following examples, which are intended as informative and typical only and not in a limiting sense, will further illustrate the invention.

EXAMPLE I

This example demonstrates the advantages of our invention over the prior art. It is now possible, by means of our invention, to hydrolyze starch containing such high amounts of insoluble protein that it heretofore would have been considered entirely unsuitable for the production of high quality dextrose liquors. As will be apparent from Table I, set forth hereinafter, soluble protein in the final hydrolyzates obtained from such high protein starches and the amounts of carbon required to refine such hydrolyzates were reduced to practical levels only when the process of our invention was employed.

Corn (maize) starch containing 2.3 percent, dry basis, of insoluble protein was hydrolyzed and treated in three different manners described hereinafter, to produce liquors A, B, and C. A second lot of corn (maize) starch containing 5.4 percent, dry basis, of insoluble protein was likewise treated to produce liquors D, E, and F. The analyses of the liquors are set forth in Table I, appearing hereinafter.

Liquor A was produced as follows:

A slurry of the starch was made and its density adjusted to 10.5° Bé. and sufficient hydrochloric acid was added thereto to raise the normality of the slurry to 0.051. Then 1800 ml. of the acidified slurry was hydrolyzed in a small, laboratory autoclave at 45 lbs. steam pressure (292° F.) for 30 minutes. The pressure was released from the autoclave, the hydrolyzate cooled to room temperature and the pH adjusted to 4.7 by slow addition of a 20 percent solution of sodium hydroxide, the hydrolyzate being stirred during the addition. The liquor was then filtered over a filter aid and then decolorized with vegetable carbon. The D. E. value of the hydrolyzate was 88.8.

Liquor B was prepared as follows:

A slurry of the starch was made and its density adjusted to 10.5° Bé. and sufficient hydrochloric acid was added thereto to raise the normality of the slurry to 0.035. Then 1800 ml. of the acidified slurry was hydrolyzed in a small, laboratory autoclave at 20 lbs. steam pressure (259° F.) for 24 minutes. The pressure was released from the autoclave. The partial hydrolyzate was cooled to room temperature and filtered over filter aid. The D. E. value of the partial hydrolyzate at this point was 42.5 percent, dry basis.

The normality of the filtered hydrolyzate was readjusted to 0.035 with hydrochloric acid and then hydrolyzed at 45 lbs. steam pressure (292° F.) for 25 minutes. The pressure was released from the autoclave and the final hydrolyzate cooled to room temperature. The pH of the hydrolyzate was adjusted to 4.7 with a 20 percent solution of sodium hydroxide. Next the final hydrolyzate was filtered over filter aid and finally decolorized with activated carbon.

Liquor C was prepared as follows:

A slurry of the starch was made and its density adjusted to 10.5° Bé. and sufficient hydrochloric acid was added thereto to raise the normality of the slurry to 0.035. Then 1800 ml. of the acidified slurry was hydrolyzed in a small, laboratory autoclave at 20 lbs. steam pressure (259° F.) for 20 minutes. The pressure was released from the autoclave. To the partial hydrolyzate while still hot, was added 2 percent of Wyoming type bentonite, on dry basis, in the form of a previously hydrated slurry. The slurry was formed by stirring 4 to 5 percent of bentonite in water for 30 minutes to one hour. After the addition of the bentonite slurry to the hydrolyzate, the resultant mixture was stirred for 15 minutes, cooled to room temperature and filtered over a filter aid. The partial hydrolyzate at this point had a D. E. value of 42.5 percent, dry basis.

The normality of the clarified hydrolyzate was readjusted to 0.035 with hydrochloric acid and then the liquor was hydrolyzed at 45 lbs. steam pressure (292° F.) for 25 minutes. The pressure was released from the autoclave and the final hydrolyzate cooled to room temperature. The pH of the final hydrolyzate was adjusted to 4.7 with a 20 percent solution of sodium hydroxide. The final hydrolyzate was then filtered over a filter aid and finally decolorized with activated carbon.

Liquor D was prepared in the same manner as liquor A except that the normality of the slurry undergoing hydrolysis was 0.061.

Liquor E was prepared in the same manner as liquor B except that the normality of the slurry or liquor undergoing hydrolysis was 0.045, at both stages, and the D. E. value of the partial hydrolyzate at the end of the first stage of conversion was 52.2 percent.

Liquor F was prepared in the same manner as liquor C except that the normality of the slurry or liquor undergoing hydrolysis was 0.045, at both stages, the D. E. value of the partial hydrolyzate was 48.3 percent at the end of the first stage and the amount of bentonite used was 3 percent. In the table Sol. Prot. means soluble protein, Color is given in Lovibond units and Carbon Required refers to the amount of activated carbon required to reduce the color of the hydrolyzate from its original value to 1.0. All percentages are on the dry substance basis.

Table I

| | Protein in Starch | D. E., percent | Sol. Prot., percent | Color | Carbon Required, percent |
|---|---|---|---|---|---|
| Liquor A, 1 stage | 2.3 | 88.8 | 0.94 | 76.2 | 5.84 |
| Liquor B, 2 stage | 2.3 | 90.1 | 0.50 | 40.8 | 3.29 |
| Liquor C, 2 stage + bentonite | 2.3 | 90.1 | 0.14 | 47.1 | 2.31 |
| Liquor D, 1 stage | 5.4 | 87.4 | 2.0 | 72.8 | 11.21 |
| Liquor E, 2 stage | 5.4 | 89.2 | 1.01 | 60.5 | 6.46 |
| Liquor F, 2 stage + bentonite | 5.4 | 90.2 | 0.29 | 78.7 | 4.34 |

It is to be noted that the color of liquor C is greater than that of liquor B, and that of liquor F is greater than that of liquor E. Despite this fact, liquor C required less carbon for decolorizing than liquor B (and liquor F required less than liquor E. This may be explained on the basis of the fact that liquors C and F contain lower ratios of melanoidin type color bodies to caramel type color than liquors B and E. This was an entirely unexpected result since it would be logical to assume (as has been done in the past) that the more color that was present in starch hydrolyzates, the more decolorizing carbon would be required to remove the color.

EXAMPLE II

This example illustrates the use of bentonite after the second stage of conversion, and the advantage of the present invention over single stage conversion.

A slurry of corn (maize) starch containing 2.62 percent, dry basis, of insoluble protein was made and its density adjusted to 10.5° Bé. Sufficient hydrochloric acid was added thereto to raise the normality thereof to 0.039. Then 1800 ml. of the acidified slurry was hydrolyzed in a small, laboratory autoclave at 20 lbs. steam pressure (259° F.) for 20 minutes. The pressure was released from the autoclave. The pH of the partial hydrolyzate was adjusted to 4.7 and then the hydrolyzate was filtered over filter aid. The D. E. value of the partial hydrolyzate at this point was 44.9.

To the filtered partial hydrolyzate was added sufficient hydrochloric acid to raise the normality thereof to 0.038. Then the hydrolyzate was further hydrolyzed at 45 lbs. steam pressure (292° F.) for 25 minutes until the D. E. value was 90.4 percent. The pressure was released from the autoclave. To the final hydrolyzate was added immediately 2 percent of bentonite (Wyoming type), on dry basis, in the form of a previously hydrated slurry. After the addition of the bentonite slurry to the final hydrolyzate, the resultant mixture was stirred for 15 minutes, cooled to room temperature and filtered over filter aid. The analysis of the final hydrolyzate, referred to hereinafter as liquor G, is set forth in Table II along with that of liquor H which was a single stage hydrolyzate prepared by the method described for the preparation of liquor A in Example I. All percentages are on the dry substance basis. The starch used in the preparation of liquor H was from the same lot as that used in preparation of liquor G.

Table II

| | D. E., percent | Sol. Prot., percent | Color | Carbon, percent |
|---|---|---|---|---|
| Liquor G, 2 stage+bentonite | 90.4 | 0.175 | 40.3 | 3.44 |
| Liquor H, 1 stage | 89.0 | 1.04 | 98 | 7.58 |

EXAMPLE III

In this example hydrolysis in the first stage was carried out to a relatively low D. E. value, i. e., about 20. Data are also presented to demonstrate the advantages over the prior art of two stage conversion plus refining with bentonite in accordance with the principles of our invention.

Corn (maize) starch containing 2.30 percent, dry basis, of insoluble protein was hydrolyzed and treated in accordance with the methods described in Example I to produce liquors J, K, and L. A second lot of corn (miaze) starch containing 4.52 percent, dry basis, of insoluble protein was treated similarly to produce liquors M, N, and O. Conversion conditions and analyses of the liquors are set forth below in Table III.

EXAMPLE IV

This example will illustrate the use of bentonite during the second stage of conversion.

Corn starch containing 1.39 percent, dry basis, of insoluble protein was hydrolyzed in accordance with the procedure described in Example II. Analyses of the liquors are set forth below in Table IV.

Table IV

| Liquor | Stage of Conversion | Bentonite Added | D. E., percent | Color | Soluble Protein, percent | Carbon Required, percent |
|---|---|---|---|---|---|---|
| P | Single | None | 90.2 | 63.2 | 0.613 | 3.91 |
| Q | 1 | None | 34.8 | 1.8 | 0.162 | |
| | 2 | None | 90.1 | 43.9 | 0.175 | 1.64 |
| R | 1 | 1% after 1st stage | 35.8 | 2.7 | 0.094 | |
| | 2 | None | 91.0 | 53.2 | 0.088 | 1.51 |
| S | 1 | 2% after 1st stage | 30.8 | 1.8 | 0.088 | |
| | 2 | None | 90.2 | 46.2 | 0.088 | 1.25 |
| T | 1 | None | 32.1 | 1.6 | 0.187 | |
| | 2 | 1% during 2nd stage | 90.4 | 29.2 | 0.112 | 0.94 |
| U | 1 | None | 30.2 | 1.6 | 0.187 | |
| | 2 | 2% during 2nd stage | 90.0 | 21.6 | 0.112 | 0.95 |

The results show that the preferred procedure is to add the bentonite to the converter just prior to the second stage of conversion so that the bentonite is present during the second stage of conversion.

EXAMPLE V

This example will show the application of the present invention to the hydrolysis of milo starch on a commercial basis. The values in parentheses indicate practical operating conditions.

A slurry of milo starch containing 5 (3 to 7) percent, dry basis, of insoluble protein and 0.20 (0.1 to 0.6) percent of solubles (dry basis) and having a density of 20° Bé (16 to 23) is mixed with sufficient sulfuric acid to give the slurry a normality of 0.032 (0.02 to 0.04). The pH of the slurry will be about 1.5 (1.4 to 2.0). About 0.5 (0.5 to 0.75) percent, dry basis, of bentonite (Wyoming type) may be added to the slurry at this point, if desired. The slurry is then introduced into a continuous type converter and hydrolyzed at 58 (50 to 66) p. s. i. for about 4

Table III

| Conversion Conditions | ° Bé | Temp., ° F. |
|---|---|---|
| First Stage | 10.5 | 259 (20 p. s. i.) |
| Second Stage | 10.5 | 292 (45 p. s. i.) |

| | Prot. in Starch | Conversion Acidity, N | | Liquor D. E. | | Final Liquor | | |
|---|---|---|---|---|---|---|---|---|
| | | First Stage | Second Stage | First Stage | Second Stage | Color | Sol. Prot. | Carbon Required |
| | Percent | Percent | Percent | Percent | Percent | | Percent | Percent |
| Liquor J, 1 stage | 2.30 | 0.051 | | 89.0 | | 77.2 | 0.87 | 5.86 |
| Liquor K, 2 stage | 2.30 | 0.035 | 0.035 | 21.2 | 90.7 | 41.2 | 0.407 | 3.32 |
| Liquor L, 2 stage + 2% bentonite | 2.30 | 0.035 | 0.035 | 20.6 | 90.1 | 60.5 | 0.15 | 2.21 |
| Liquor M, 1 stage | 4.52 | 0.059 | | 88.5 | | 81.7 | 1.61 | 10.10 |
| Liquor N, 2 stage | 4.52 | 0.045 | 0.045 | 20.9 | 90.0 | 47.3 | 0.657 | 4.58 |
| Liquor O, 2 stage + 3% bentonite | 4.52 | 0.045 | 0.045 | 19.9 | 90.0 | 92.3 | 0.206 | 3.50 |

Again, it is to be noted, as in Example I, that the color values for the liquors obtained by two stage conversion plus treatment with bentonite are higher than those for the liquors obtained by two stage conversion but without treatment with bentonite, and yet the carbon requirement for decolorization was less.

(3 to 6) minutes, the flow rate of the contents of the converter being 100 g. p. m. (65 to 130), to give the partial hydrolyzate a D. E. value of 35 (30 to 55) percent. The hydrolyzate is then treated with 0.5 (0.5 to 0.75) percent, dry basis, of bentonite for about 35 (20 to 40) minutes. If no bentonite has been added previously, the amount added at this point should be about 1.0 (1.0 to 1.5) percent. Then the partial hydrolyzate is filtered. The normality of the filtered liquor is adjusted to 0.029 (0.02 to 0.04) with sulfuric acid and the density is adjusted to about 10° (8 to 12) Bé. Then the liquor is introduced into a second continuous converter and hydrolyzed at 58 (50 to 70) p. s. i. for about 30 (30 to 45) minutes, the flow rate of the hydrolyzate being 180 g. p. m. (120 to 180), to give the final hydrolyzate a D. E. value of 91 (88 to 92) percent. The final hydrolyzate is treated with once used vegetable carbon and filtered. Thereafter the hydrolyzate is treated with ion exchange resins in the manner described in U. S. Patent 2,606,847 referred to hereinabove, to demineralize and refine the liquor, the pH of the final effluent being about 4.0 (3.5 to 5.4). The hydrolyzate is then given a final decolorizing treatment with activated carbon and is concentrated and the concentrated liquor allowed to crystallize. The mother liquor from the crystallization is returned to the process in accordance with the principles of U. S. Patent No. 2,606,847.

The yield (on the basis of starch) and quality of crystalline dextrose obtained from the starch containing such high amount of insoluble protein is the same as those obtained from prime starch (containing below 0.5 percent of insoluble protein) using the conventional method of hydrolysis and refining.

EXAMPLE VI

This example illustrates how the degree of refining depends upon the amount and type of bentonite used. Five 200 ml. portions of dextrose converter liquor prepared by hydrolyzing a starch slurry having a Bé. of 10° with 0.03 normal hydrochloric acid to a D. E. of 90.6 percent, were transferred to 400 ml. beakers and the contents heated to 190° F. (88° C.). Weighed amounts of bentonite equivalent to 0.25, 0.5, 0.75, 1.0 and 0.0 percent of the dextrose converter liquor, dry basis, were added to the samples of liquor. Following the addition of the bentonite, each mixture was stirred for 1.5 minutes with a mechanical laboratory agitator. Then 0.5 g. of filter aid was added to each sample. After an additional 0.5 minute stirring period, the treated liquor sample was filtered by gravity through a 24 cm. No. 1 Whatman filter paper. The filtrate in each case was tested for percentage of light transmission at 650 mu with a spectrophotometer. Such measurement is an index of liquor clarity, 100 percent transmission representing perfect optical clarity. The results are shown in the table below:

Table V

| Type of Bentonite | Bentonite (Percent D. B.) | Percent Transmission at 650 mu |
|---|---|---|
| None | 0.0 | 33.5 |
| Argentine type bentonite | 0.25 | 33.0 |
|  | 0.50 | 43.5 |
|  | 0.75 | 48.0 |
|  | 1.00 | 62.5 |
| Volclay KWK* type bentonite | 0.25 | 50.0 |
|  | 0.50 | 94.5 |
|  | 0.75 | 98.0 |
|  | 1.00 | 98.0 |

*Trademark for Wyoming type bentonite.

This application is a continuation-in-part of application Serial No. 323,496, filed December 1, 1952.

We claim:

1. The process of producing dextrose liquors, suitable for sirups or crystalline dextrose, from starch containing more than about 1.0 percent, dry basis, of insoluble protein, which comprises hydrolyzing said starch in aqueous slurry with acid to a D. E. value within about 18 to about 55 percent, adjusting the pH of the partial hydrolyzate to a value within the range of the pH employed during hydrolysis and 5.5, separating insoluble impurities from said partial hydrolyzate, and further hydrolyzing said partial hydrolyzate with acid until the D. E. value is above about 60 percent, adjusting the pH of the final hydrolyzate to a value within the pH employed during the last mentioned hydrolysis and 5.5, and separating insoluble impurities from said final hydrolyzate, the hydrolyzate in at least one stage being treated with bentonite.

2. The process of producing dextrose liquors, suitable for sirups or crystalline dextrose, from starch obtained from cereal grains and containing more than about 1.0 percent, dry basis, of insoluble protein, which comprises hydrolyzing said starch in aqueous slurry with acid to a D. E. value within about 18 to about 55 percent, adjusting the pH of the partial hydrolyzate to a value within the range of the pH employed during hydrolysis and 5.5, separating insoluble impurities from said partial hydrolyzate, and further hydrolyzing said partial hydrolyzate with acid until the D. E. value is above about 60 percent, adjusting the pH of the final hydrolyzate to a value within the pH employed during the last mentioned hydrolysis and 5.5, and separating insoluble impurities from said final hydrolyzate, the hydrolyzate in at least one stage being treated with bentonite.

3. The process according to claim 1 wherein the partial hydrolyzate is treated with said bentonite prior to the step of separating impurities from said hydrolyzate.

4. The process according to claim 2 wherein the partial hydrolyzate is treated with said bentonite prior to the step of separating impurities from said hydrolyzate.

5. The process according to claim 1 wherein the final hydrolyzate is treated with said bentonite prior to the step of separating impurities from said hydrolyzate.

6. The process according to claim 2 wherein the final hydrolyzate is treated with said bentonite prior to the step of separating impurities from said hydrolyzate.

7. The process according to claim 1 wherein said bentonite is present in the converter during the second stage of the hydrolysis.

8. The process according to claim 2 wherein said bentonite is present in the converter during the second stage of the hydrolysis.

9. The process of producing crystalline dextrose from starch containing about 1.0 percent to about 10 percent, dry basis, of insoluble protein, which comprises hydrolyzing said starch in aqueous slurry with acid to a D. E. value within about 18 to about 55 percent, adjusting the pH of the partial hydrolyzate to a value within the range of the pH employed during hydrolysis and 5.5, separating insoluble impurities from said partial hydrolyzate, and further hydrolyzing said partial hydrolyzate until the D. E. value is about 88 to about 92 percent, adjusting the pH of the final hydrolyzate to a value within the pH employed during the last mentioned hydrolysis and 5.5, and separating insoluble impurities from said final hydrolyzate and refining and crystallizing the resultant liquor, the hydrolyzate in at least one stage being treated with bentonite.

10. The process of producing crystalline dextrose from starch obtained from cereal grain and containing about 1.0 percent to about 10 percent, dry basis, of insoluble protein, which comprises hydrolyzing said starch in aqueous slurry with acid to a D. E. value within about 30 to about 40 percent, adjusting the pH of the partial hydrolyzate to a value within the range of the pH employed during hydrolysis and 5.5, separating insoluble impurities from said partial hydrolyzate, and further hydrolyzing said partial hydrolyzate until the D. E. value is about 88 to about 92 percent, adjusting the pH of the final hydrolyzate to a value within the pH employed during the last mentioned hydrolysis and 5.5, and separating insoluble impurities from said final hydrolyzate and refining and crystallizing the resultant liquor, the hydrolyzate in at least one stage being treated with bentonite.

11. The process of producing crystalline dextrose from starch containing about 1.0 to about 10 percent, dry basis, of insoluble protein which comprises hydrolyzing said starch in aqueous slurry, with acid to a D. E. value within about 18 to about 55 percent, treating the resultant partial hydrolyzate with bentonite and separating insoluble impurities from said partial hydrolyzate, and further hydrolyzing said partial hydrolyzate until the D. E. value is about 88 to about 92 percent, and demineralizing and refining the final hydrolyzate and recovering crystalline dextrose therefrom.

12. The process of producing crystalline dextrose from starch obtained from cereal grain containing about 1.0 to about 10 percent, dry basis, of insoluble protein which comprises hydrolyzing said starch in aqueous slurry, with acid to a D. E. value within about 30 to about 40 percent, treating the resultant partial hydrolyzate with bentonite and separating insoluble impurities from said partial hydrolyzate, and further hydrolyzing said partial hydrolyzate until the D. E. value is about 88 to about 92 percent, and demineralizing and refining the final hydrolyzate and recovering crystalline dextrose therefrom.

13. The process of producing crystalline dextrose from starch obtained from cereal grain containing about 1.0 to about 10 percent, dry basis, of insoluble protein, which comprises hydrolyzing said starch, in aqueous slurry having a density of about 8 to about 23° Bé., with acid to a D. E. value within about 30 to about 40 percent, adjusting the pH of the partial hydrolyzate to a value within the range of the pH employed during hydrolysis and 5.5, separating insoluble impurities from said partial hydrolyzate, adjusting the density of said partial hydrolyzate to about 8° to about 12° Bé., and further hydrolyzing said hydrolyzate until the D. E. value is about 88 to about 92 percent, adjusting the pH of the final hydrolyzate to a value within the pH employed during the last mentioned hydrolysis and 5.5, and separating insoluble impurities from said final hydrolyzate, and refining the final hydrolyzate and recovering crystalline dextrose therefrom, the hydrolyzate in at least one stage being treated with bentonite.

14. The process of producing crystalline dextrose from starch obtained from cereal grain and containing about 1.0 percent to about 10 percent, dry basis, of insoluble protein, which comprises hydrolyzing said starch in aqueous slurry with acid to a D. E. value within about 30 to about 40 percent, adjusting the pH of the partial hydrolyzate to a value within the range of the pH employed during hydrolysis and 5.5, separating insoluble impurities from said partial hydrolyzate, and further hydrolyzing said partial hydrolyzate until the D. E. value is about 88 to about 92 percent, adjusting the pH of the final hydrolyzate to a value within the pH employed during the last mentioned hydrolysis and 5.5, and separating insoluble impurities from said final hydrolyzate and refining and crystallizing the resultant liquor, bentonite being present during the second stage of hydrolysis.

References Cited in the file of this patent

UNITED STATES PATENTS

| | | |
|---|---|---|
| 1,556,854 | Lenders | Oct. 13, 1925 |
| 1,668,308 | Ebert | May 1, 1928 |
| 1,876,883 | Ebert | Sept. 13, 1932 |
| 2,137,973 | Daly | Nov. 22, 1938 |
| 2,261,917 | Pittman et al. | Nov. 4, 1941 |
| 2,261,920 | Groff et al. | Nov. 4, 1941 |
| 2,307,326 | Lissauer et al. | Jan. 5, 1943 |
| 2,332,758 | Schopmeyer | Oct. 26, 1943 |
| 2,389,119 | Cantor | Nov. 20, 1945 |
| 2,490,716 | Smith et al. | Dec. 6, 1949 |
| 2,606,847 | Newkirk et al. | Aug. 12, 1952 |
| 2,610,132 | Newkirk et al. | Sept. 9, 1952 |

OTHER REFERENCES

Radley: "Starch and Its Derivatives," 2nd. ed., New York, N. Y., 1944, pp. 215–217.